(12) United States Patent
Kaddouh

(10) Patent No.: US 11,518,311 B2
(45) Date of Patent: Dec. 6, 2022

(54) VEHICLE RUNNING BOARDS WITH REMOVABLE STEPS

(71) Applicant: Nissan North America, Inc., Franklin, TN (US)

(72) Inventor: Sam Kaddouh, Grosse Pointe Park, MI (US)

(73) Assignee: Nissan North America, Inc., Franklin, TN (US)

( * ) Notice: Subject to any disclaimer, the term of this patent is extended or adjusted under 35 U.S.C. 154(b) by 420 days.

(21) Appl. No.: 16/549,538

(22) Filed: Aug. 23, 2019

(65) Prior Publication Data

US 2021/0053496 A1 Feb. 25, 2021

(51) Int. Cl.
*B60R 3/00* (2006.01)

(52) U.S. Cl.
CPC .............. *B60R 3/007* (2013.01); *B60R 3/002* (2013.01)

(58) Field of Classification Search
CPC ............ B60R 3/007; B60R 3/002; B60R 3/00
See application file for complete search history.

(56) References Cited

U.S. PATENT DOCUMENTS

| 4,935,638 | A | * | 6/1990 | Straka | B60R 3/00 280/163 |
| 5,193,829 | A | * | 3/1993 | Holloway | B60R 3/002 280/163 |
| 6,135,472 | A | * | 10/2000 | Wilson | B60R 3/02 280/166 |
| 6,412,799 | B1 | * | 7/2002 | Schrempf | B60R 3/002 280/163 |
| 6,588,781 | B2 | * | 7/2003 | Pohill | B60R 3/002 280/163 |
| 6,588,782 | B2 | * | 7/2003 | Coomber | B60R 3/002 280/163 |
| 6,726,230 | B2 | * | 4/2004 | Weir | B60R 3/002 280/163 |

(Continued)

OTHER PUBLICATIONS

Ajaa Hexagon 2005-2019 Fit Toyota Tacoma Double Cab 4 Dr Hex Style Running Boards (Nerf Bars | Side Steps | Side Rails), product webpage, viewed Aug. 1, 2019; https://www.amazon.com/Ajaa-2005-2019-Toyota-Tacoma-Running/dp/B075GZD9KY.

(Continued)

*Primary Examiner* — James M Dolak
(74) *Attorney, Agent, or Firm* — Young Basile Hanlon & MacFarlane, P.C.

(57) ABSTRACT

Running boards for vehicles are disclosed that each include a rail with one or more steps. The step(s) are releasably connectable to (supported by) the rail (e.g., via a plurality of removable mechanical fasteners) to allow for removal of the step(s) when additional ground clearance is necessary and/or desirable, such as, for example, during off-road use of the vehicle. The rail of each running board is connectable to an underside of the vehicle (e.g., via brackets) such that the rails are positioned to absorb impact from external objects, such as, for example, rocks, boulders, stumps, etc., traversed during travel across uneven ground, and thereby protect the vehicle. In certain embodiments, the rails may include internal supports (e.g., stiffening ribs) to increase the strength and/or the rigidity of the rail, and, thus, increase the protection to the vehicle provided by the running boards.

20 Claims, 7 Drawing Sheets

(56) References Cited

U.S. PATENT DOCUMENTS

| | | | |
|---|---|---|---|
| 7,380,806 B2 * | 6/2008 | Mulder | B60R 3/00 |
| | | | 280/163 |
| 7,945,604 B2 * | 5/2011 | Wang | G06F 16/284 |
| | | | 707/960 |
| 8,016,309 B2 * | 9/2011 | Flajnik | B60R 3/002 |
| | | | 280/169 |
| 8,152,187 B1 * | 4/2012 | Crandall | B60R 3/002 |
| | | | 280/169 |
| 8,827,293 B1 * | 9/2014 | Bundy | B60R 3/00 |
| | | | 280/163 |
| 9,346,404 B1 * | 5/2016 | Bundy | B60R 3/00 |
| 9,399,431 B2 * | 7/2016 | Crandall | B60R 3/002 |
| D789,858 S | 6/2017 | Hare | |
| 9,937,865 B1 * | 4/2018 | Oakey | B60R 3/002 |
| 10,391,944 B2 * | 8/2019 | Stanesic | G06T 1/60 |
| 10,486,602 B1 * | 11/2019 | Bundy | B60R 3/00 |
| 10,604,077 B2 * | 3/2020 | Stanesic | G06T 1/60 |
| 10,688,933 B2 * | 6/2020 | Knichel | B60R 3/00 |
| 10,737,625 B2 * | 8/2020 | Michie | B60R 3/002 |
| 10,821,903 B2 * | 11/2020 | Stanesic | B60R 3/007 |
| 10,981,512 B2 * | 4/2021 | Crandall | B60Q 1/2661 |
| 11,036,210 B2 * | 6/2021 | Crandall | B33Y 80/00 |
| 11,046,252 B1 * | 6/2021 | Bundy | B60R 3/002 |
| 11,214,200 B1 * | 1/2022 | Oakey | B60R 3/002 |
| 2010/0194070 A1 | 8/2010 | Stauffer et al. | |
| 2013/0221632 A1 * | 8/2013 | Higgs | B60R 3/00 |
| | | | 280/169 |
| 2019/0126832 A1 | 5/2019 | Knichel | |

OTHER PUBLICATIONS

Dee Zee Truck Accessories, Hex Side Step, product website, viewed Aug. 1, 2019, https://www.deezee.com/product/hex-side-step/.

Westin Automotive, Nerf Step Bars & Running Boards, product website, viewed Aug. 1, 2019, https://www.westinautomotive.com/nerf-step-bars-running-boards.

Tuff Truck Parts, Running Boards / Step Bars, product website, viewed Aug. 1, 2019, https://tufftruckparts.com/c-1210162-exterior-accessories-running-boards-steps-bars.html.

* cited by examiner

VEHICLE RUNNING BOARDS WITH REMOVABLE STEPS

TECHNICAL FIELD

The present disclosure relates to running boards for vehicles, and, more specifically, to running boards that include at least one removable step.

BACKGROUND

In additional to contributing to the overall appearance of a vehicle, running boards assist passengers during entry into and exit from the vehicle. Typically, running boards include a rail with one or more fixed steps, and offer little in terms of impact absorption. Thus, there remains a need for running boards with removable steps and reinforced rails to increase not only ground clearance, but the protection offered to the vehicle, in particular during off-roading activities and/or travel across uneven ground.

SUMMARY

In one aspect of the present disclosure, a running board for a vehicle is disclosed. The running board includes a rail defining an upper mounting surface and a lower mounting surface, and at least one step that is configured for removable connection to the rail. The at least one step includes: a front end portion; a rear end portion opposite the front end portion; and upper and lower flanges that collectively define a receiving space that is configured to receive the rail. The upper flange extends continuously between the front end portion and the rear end portion and is configured for contact with the upper mounting surface of the rail, and the lower flange is configured for contact with the lower mounting surface of the rail.

In certain embodiments, the lower flange may extend non-continuously between the front end portion and the rear end portion of the at least one step. For example, the lower flange may include a first (front) leg that is located adjacent to the front end portion of the at least one step and a second (rear) leg that is located adjacent to the rear end portion of the at least one step.

In certain embodiments, the lower flange may extend continuously between the front end portion and the rear end portion of the at least one step.

In certain embodiments, the rail may include an irregular hexagonal configuration.

In certain embodiments, the rail may be symmetrical about a single axis that extends in generally orthogonal relation to a length of the rail.

In certain embodiments, the rail may include: a first side that defines the upper mounting surface and extends in generally parallel relation to the upper flange of the at least one step; a second side that extends from the first side in generally orthogonal relation; a third side that extends from the second side; a fourth side that extends from the third side; a fifth side that extends from the fourth side in generally parallel relation to the second side; and a sixth side that extends between the fifth side and the first side.

In certain embodiments, the third side may define the lower mounting surface and may extend in generally parallel relation to the lower flange of the at least one step.

In certain embodiments, the rail may further include a plurality of internal supports to increase rigidity of the rail.

In certain embodiments, the plurality of internal supports may be interconnected at a juncture.

In certain embodiments, the juncture may be eccentrically located within the rail.

In certain embodiments, the plurality of internal supports may define a plurality of internal passages each defining a different cross-sectional area.

In certain embodiments, the plurality of internal supports may include a first support and a second support.

In certain embodiments, the first support may extend between the second side and a vertex defined by the fifth side and the sixth side.

In certain embodiments, the second support may extend between the first side and a vertex defined by the third side and the fourth side.

In another aspect of the present disclosure, a running board for a vehicle is disclosed. The running board includes: a rail that defines an upper channel and a lower channel each extending longitudinally along a length of the rail and each including a plurality of openings; at least one step that is configured for removable connection to the rail; a plurality of receptacles that are configured for insertion into the plurality of openings in the upper channel and the lower channel; and a plurality of fasteners that are configured for insertion into the plurality of receptacles to removably connect the at least one step to the rail.

In certain embodiments, the upper channel may be recessed into an upper surface of the rail and the lower channel may be recessed into a lower surface of the rail whereby the plurality of receptacles are received in the plurality of openings such that the plurality of receptacles are flush with the upper surface of the rail and the lower surface of the rail.

In certain embodiments, the plurality of fasteners may be configured for toolless insertion into and removal from the receptacles.

In certain embodiments, the rail may further include a plurality of internal supports to increase rigidity of the rail.

In certain embodiments, the plurality of internal supports may include a first support and a second support.

In certain embodiments, the first and second supports may be interconnected at a juncture that is located eccentrically within the rail.

In certain embodiments, the plurality of internal supports may define a plurality of internal passages within the rail.

In certain embodiments, the plurality of openings (in the upper channel and the lower channel) may be positioned, and the plurality of internal supports may be configured, such that the plurality of fasteners are insertable into the plurality of internal passages so as to avoid contact with the plurality of internal supports.

In another aspect of the present disclosure, a running board for a vehicle is disclosed that includes at least one step, and a rail that is configured to releasably support the at least one step. The rail includes a plurality of internal supports that extend crosswise within the rail to increase rigidity of the rail. The plurality of internal supports are interconnected at a juncture that is located eccentrically within the rail.

In certain embodiments, the rail may include an irregular hexagonal configuration.

In certain embodiments, the rail may include a transverse cross-sectional configuration that is symmetrical about a single axis extending in generally orthogonal relation to a length of the rail.

In certain embodiments, the internal supports may define a plurality of internal passages each defining a different cross-sectional area.

BRIEF DESCRIPTION OF THE DRAWINGS

According to common practice, the various features of the drawings may not be to scale, and may be arbitrarily expanded or reduced for clarity.

DETAILED DESCRIPTION

The present disclosure describes running boards for vehicles that include a rail with one or more steps. The step(s) are releasably connectable to (supported by) the rail (e.g., via a plurality of removable mechanical fasteners) to allow for removal of the step(s) when additional ground clearance is necessary and/or desirable, such as, for example, during off-road use of the vehicle. The rail of each running board is connectable to an underside of the vehicle (e.g., via brackets) such that the rails are positioned to absorb impact from external objects, such as, for example, rocks, boulders, stumps, etc., traversed during travel across uneven ground, and thereby protect the vehicle. In certain embodiments, the rails may include internal supports (e.g., stiffening ribs) to increase the strength and/or the rigidity of the rails, and, thus, increase the protection to the vehicle provided by the running boards.

Figure 1:
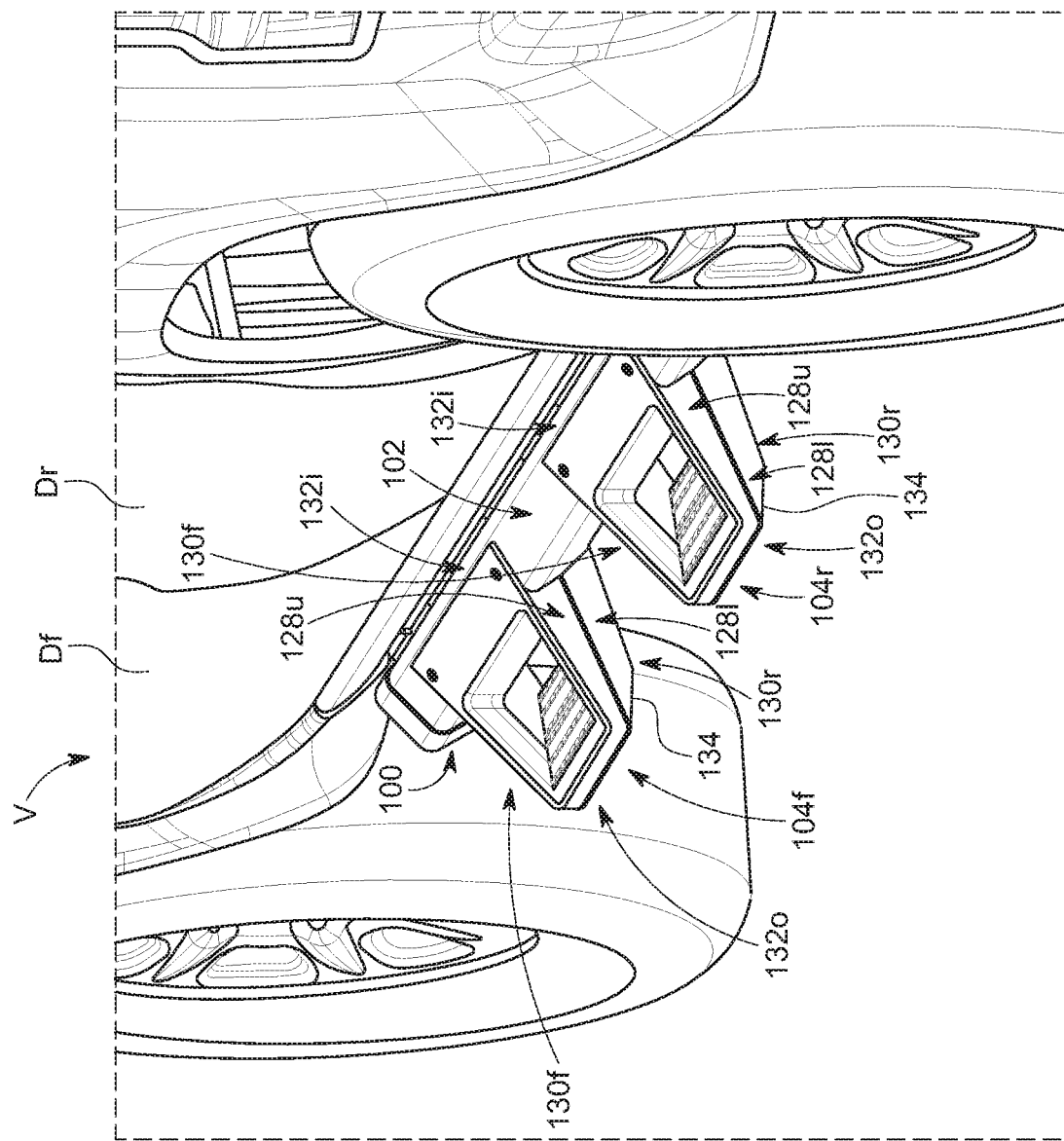
FIG. 1 is a side, perspective view of a vehicle with running boards each including a rail and one or more removable steps in accordance with the principles of the present disclosure.

With reference to FIG. 1, a vehicle V (e.g., a sport utility vehicle, a pickup truck, or the like) is illustrated, which includes a pair of running boards 100. The running boards 100 are connected to an underside of the vehicle V, as will be described in further detail below, and assist passengers during entry and exit. While a single running board 100 is shown throughout the figures and described below, it should be understood that the vehicle V may include one or more additional running boards 100 in various embodiments of the disclosure (i.e., such that the vehicle V includes one or more running boards 100 on each of the driver side and the passenger side of the vehicle V).

Figure 2:
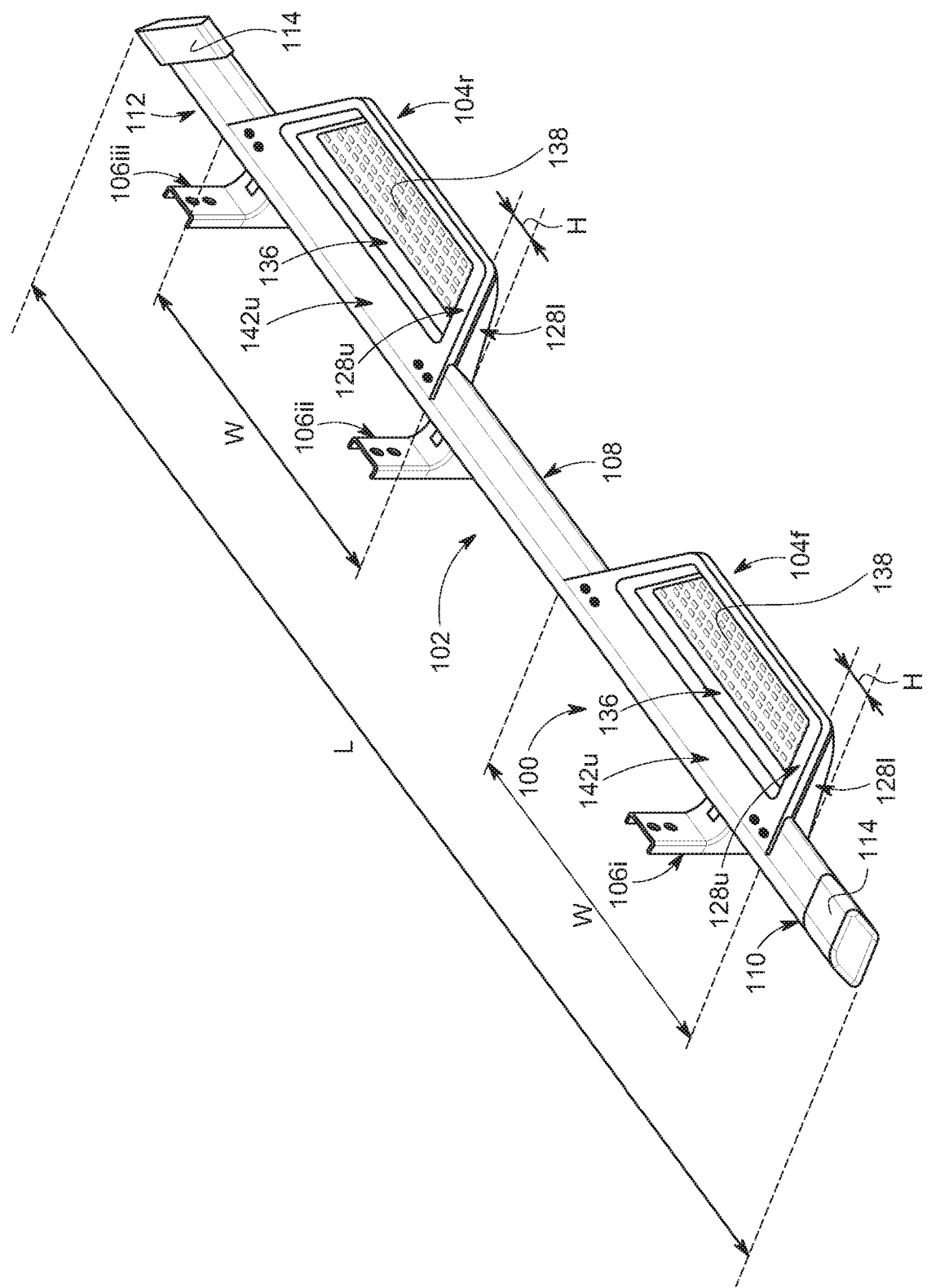
FIG. 2 is a top, perspective view of the running board shown separated from the vehicle.
Figure 3:
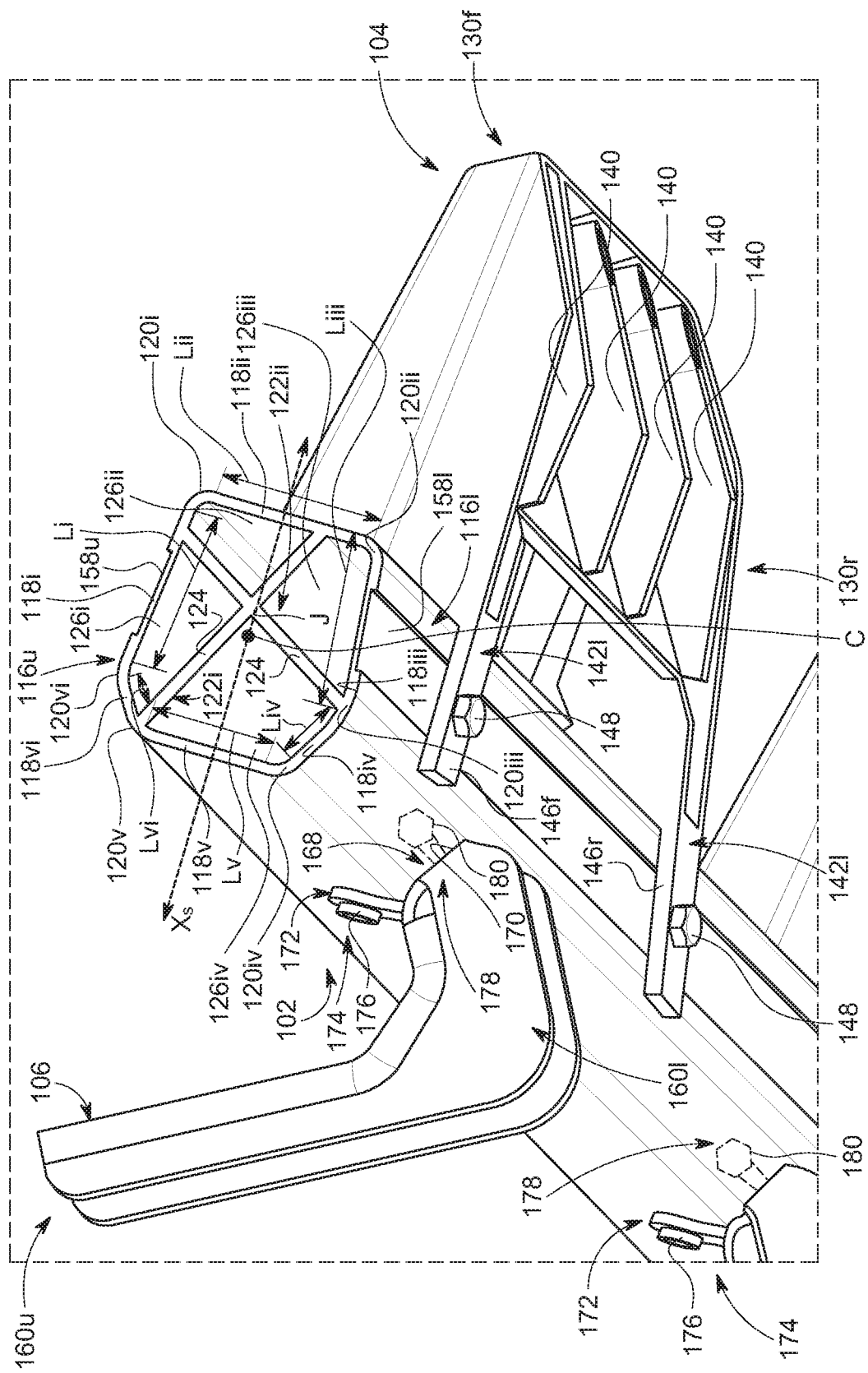
FIG. 3 is a bottom, perspective view of the running board shown separated from the vehicle.

Referring to FIGS. 2 and 3 as well, the running board 100 includes: a rail 102; one or more steps 104 that are removably connectable to (releasably supported by) the rail 102; and one or more brackets 106 (or other such supports) that are configured to secure the rail 102 to the vehicle V. The running board 100, and the various components thereof, may include (e.g., may be formed partially or entirely from) any suitable material or combination of materials, such as, for example, aluminum, steel, carbon fiber, etc., and may be formed through any suitable manufacturing process, such as, for example, extruding, machining, casting, etc.

The rail 102 includes a body 108 with opposing (front and rear) ends 110, 112, and defines an overall length L. In certain embodiments, such as those illustrated throughout the figures, the ends 110, 112 of the rail 102 may be closed (e.g., to vary the overall appearance of the running board 100 and/or inhibit (if not entirely prevent) water, debris, mud, and the like from collecting within the rail 102). For example, the rail 102 may include an end cap 114 at each of the ends 110, 112.

The rail 102 defines upper and lower mounting surfaces 116*u*, 116*l* (FIG. 3) that facilitate connection of the step(s) 104 to the rail 102, as described in further detail below. More specifically, as seen in FIG. 3, the rail 102 includes a transverse (vertical) cross-sectional configuration defining: a generally horizontal first side 118*i* (which provides the upper mounting surface 116*u*); a second side 118*ii* that extends from the first side 118*i* in generally orthogonal (vertical) relation so as to define a first vertex 120*i*; a third side 118*iii* (which provides the lower mounting surface 116*l*) that extends from the second side 118*ii* in generally orthogonal (horizontal) relation so as to define a second vertex 120*ii*; a fourth side 118*iv* that extends upwardly from the third side 118*iii* so as to define a third vertex 120*iii*; a fifth side 118*v* that extends upwardly from the fourth side 118*iv* in generally parallel (vertical) relation to the second side 118*ii* so as to define a fourth vertex 120*iv*; and a sixth side 118*vi* that extends upwardly from the fifth side 118*v* so as to connect the fifth side 118*v* and the first side 118*i* so as to define fifth and sixth vertices 120*v*, 120*vi*, respectively. As shown throughout the figures, it is envisioned that the vertices 120*i*-120*vi* may be radiused (rounded) so as to blunt the edges of the rail 102.

In the particular embodiment of the disclosure seen throughout the figures, the sides 118*i*-118*vi* are configured such that the rail 102 includes an irregular hexagonal transverse (vertical) cross-sectional configuration such that at least one of the sides 118*i*-118*vi* defines a length that differs from at least one of the others. For example, as seen in FIG. 3, the sides 118*i*-118*vi* define lengths Li-Lvi, respectively, wherein: the lengths Li, Liii are approximately equal; the length Lii is less than the lengths Li, Liii; the length Lv is less than the length Lii; and the lengths Liv, Lvi are approximately equal and less than the length Lv, whereby the rail 102 is symmetrical about a single axis of symmetry Xs that extends in generally orthogonal relation to the length L of the rail 102. It should be appreciated, however, that the particular dimensioning of the rail 102 (e.g., the sides 118) may be varied in alternate embodiments of the disclosure so as to achieve any necessary or desired configuration.

In various embodiments of the disclosure, it is envisioned that the rail 102 may include a solid construction, or, alternatively, that the rail 102 may include a hollow (tubular) construction (e.g., to reduce the overall weight of the running board 100), as shown throughout the figures. In such embodiments, the rail 102 may include one or more internal supports 122 (e.g., stiffening ribs 124) to increase the strength and/or the rigidity of the rail 102. In the particular embodiment of the disclosure shown throughout the figures, for example, the rail 102 includes a first support 122*i* that extends between the vertex 120*v* and the side 118*ii*, and a second support 122*ii* that extends between the vertex 120*iii* and the side 118*i* in crosswise (interconnecting) relation to the first support 122*i* so as to intersect the first support 122*i* at a juncture J. The supports 122*i*, 122*ii* are oriented within the body 108 so as define a plurality of internal passages 126 that extend longitudinally within (and through) the body 108. More specifically, the supports 122*i*, 122*ii* define: a first passage 126*i*; a second passage 126*ii*; a third passage 126*iii*; and a fourth passage 126*iv*.

Although illustrated as including two supports 122 and four passages 126 in the particular embodiment of the rail shown throughout the figures, it should be appreciated that the number of supports 122 and passages 126 may be varied in alternate embodiments of the present disclosure. For example, embodiments in which the rail 102 includes a single support 122 defining a pair of passages 126, or three supports defining six passages 126, would not be beyond the scope of the present disclosure.

In certain embodiments, it is envisioned that the juncture J may be centrally located within the body 108 such that the juncture J is coincident with a geometrical center C defined by the rail 102. In such embodiments, it is envisioned that two or more of the passages 126 may define equivalent transverse (vertical) cross-sectional areas. Alternatively, however, it is envisioned that the juncture J may be located eccentrically within the body 108 such that the juncture J is offset from the geometrical center C, as seen in FIG. 3, for example, whereby each of the passages 126 defines a different transverse (vertical) cross-sectional area.

In certain embodiments, it is envisioned that the support(s) 122 may be integrally (e.g., monolithically) formed with the body 108 during manufacture (e.g., during extrusion). Alternatively, however, it is envisioned that the support(s) 122 and the body 108 may be formed as separate, discrete structures. In such embodiments, the support(s) 122 may be connected to the body 108 using any suitable structures in any suitable method, such as, for example, via welding.

With reference now to FIGS. 1-8, the step(s) 104 will be discussed. The step(s) 104 are configured to assist passengers during entry and exit from the vehicle V (FIG. 1), and, as such, may positioned on the rail 102 in correspondence with doors D of the vehicle V. In the embodiment of the disclosure shown throughout the figures, the running board 100 is illustrated as including a pair of steps 104 (i.e., front and rear steps 104f, 104r that are positioned in correspondence with the vehicle V's front and rear doors Df, Dr, respectively). It should be appreciated, however, that the number of steps 104 included on the running board 100 may be varied in alternate embodiments of the disclosure. For example, it is envisioned that the running board 100 may include a single step 104 spanning (or otherwise extending between) the respective front and rear doors Df, Dr of the vehicle V.

In the embodiment of the disclosure shown throughout the figures, each of the steps 104 is identical in configuration. Accordingly, in the interest of brevity, throughout the following discussion, reference may be made to a single step 104 only.

The step 104 includes: respective upper and lower portions 128u, 128l (FIGS. 1, 2) that are connected by opposite front and rear end portions 130f, 130r and inner and outer portions 132i, 132o, respectively. In the particular embodiment of the disclosure seen throughout the figures, the step 104 defines an overall height H (FIG. 2) (which extends in generally parallel relation to the sides 118ii, 118iv of the rail 102) and an overall width W that each decrease from the inner portion 132i towards the outer portion 132o such that the step 104 includes tapered longitudinal (horizontal) and transverse (vertical) cross-sectional configurations, and is generally trapezoidal in configuration. As seen in FIG. 1, for example, whereas the upper portion 128u of the step 104 tapers in a generally uniform manner between the respective inner and outer portions 132i, 132o, the lower portion 128l of the step 104 tapers non-linearly, and includes a beveled (sloped) section 134 adjacent to the outer portion 132o.

The step 104 includes a relief 136 (FIG. 2) extending into the upper portion 128u that defines a platform 138 for use by passengers during entry into and exit from the vehicle V (FIG. 1). To increase the strength and load capabilities of the step 104, the step 104 may include one or more reinforcing struts (ribs) 140 (FIG. 3) that extend along the width W of the step 104 in correspondence with the transverse (vertical) cross-sectional configuration of the step 104.

To facilitate connection of the step 104 to the rail 102, the step 104 includes an upper flange 142u (FIG. 2) and a lower flange 142l (FIG. 3), each of which extends inwardly (towards the vehicle V) in generally parallel relation to the sides 118i, 118iii (FIG. 3) of the rail 102. The flanges 142u, 142l collectively define a receiving space 144 (FIG. 4) that is configured to receive the rail 102 such that the flange 142u is positionable adjacent to (in contact with) the upper mounting surface 116u (FIG. 3) provided by the side 118i of the rail 102 and the flange 142l is positionable adjacent to (in contact with) the lower mounting surface 116l provided by the side 118iii of the rail 102.

In the particular embodiment of the disclosure shown throughout the figures, while the flange 142u extends continuously along the length L of the step 104 between the end portions 130f, 130r, the flange 142l extends non-continuously so as to define a front (first) leg 146f (FIG. 3) that is positioned adjacent to the front end portion 130f and a rear (second) leg 146r that is positioned adjacent to the rear end portion 130r, thereby reducing the overall weight of the step 104. It should be appreciated, however, that an embodiment of the step in which the flange 142l extends continuously along the length L of the step 104 would not be beyond the scope of the present disclosure.

Figure 4:
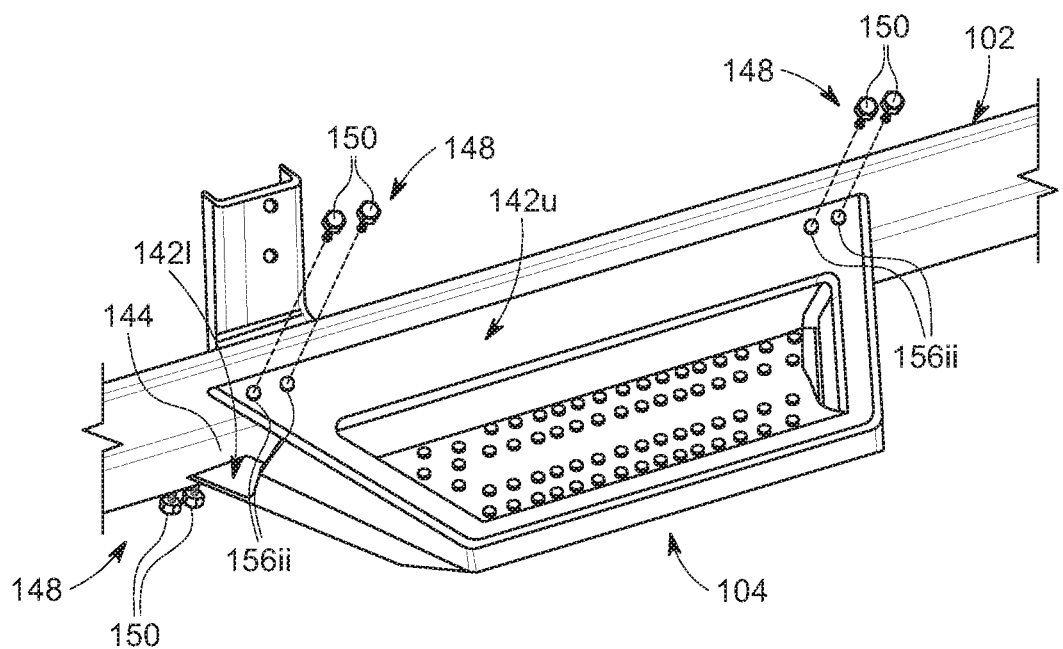
FIG. 4 is a top, perspective view of the running board shown with the step separated from the rail.

The step 104 is connectable to the rail 102 via a plurality of removable fasteners 148 (FIG. 4). More specifically, in the particular embodiment shown throughout the figures, the step 104 is connectable to the rail 102 via four bolts 150 that are threadably inserted into and through the upper flange 142u and four bolts 150 that are threadably inserted into and through the lower flange 142l. Embodiments incorporating a different number of fasteners 148, however, would not be beyond the scope of the present disclosure. Additionally, while the bolts 150 are illustrated as being configured for use with a tool during insertion and removal (e.g., a hex or Allen key, a screwdriver, etc.), in certain embodiments, it is envisioned that the bolts 150 may be configured for toolless insertion and removal. For example, the fasteners 148 may be configured as cam fasteners (not shown) or the like.

Figure 5:
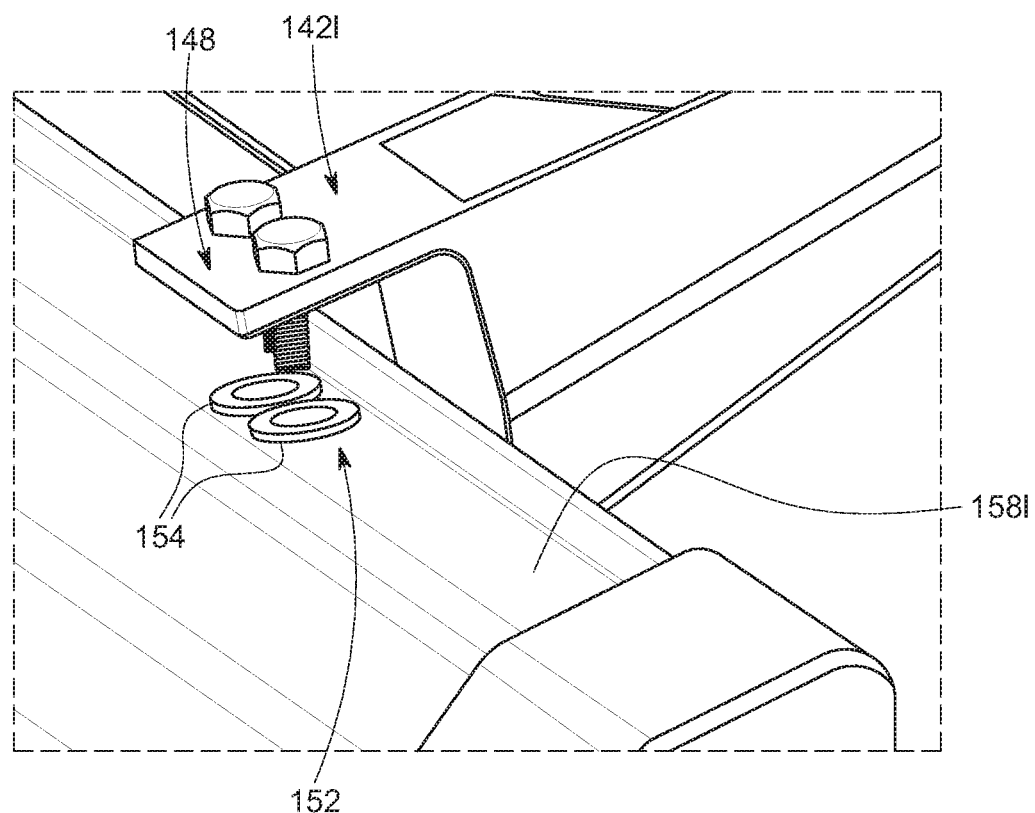
FIG. 5 is a bottom, perspective view showing connection of the step to the rail.
Figure 6:
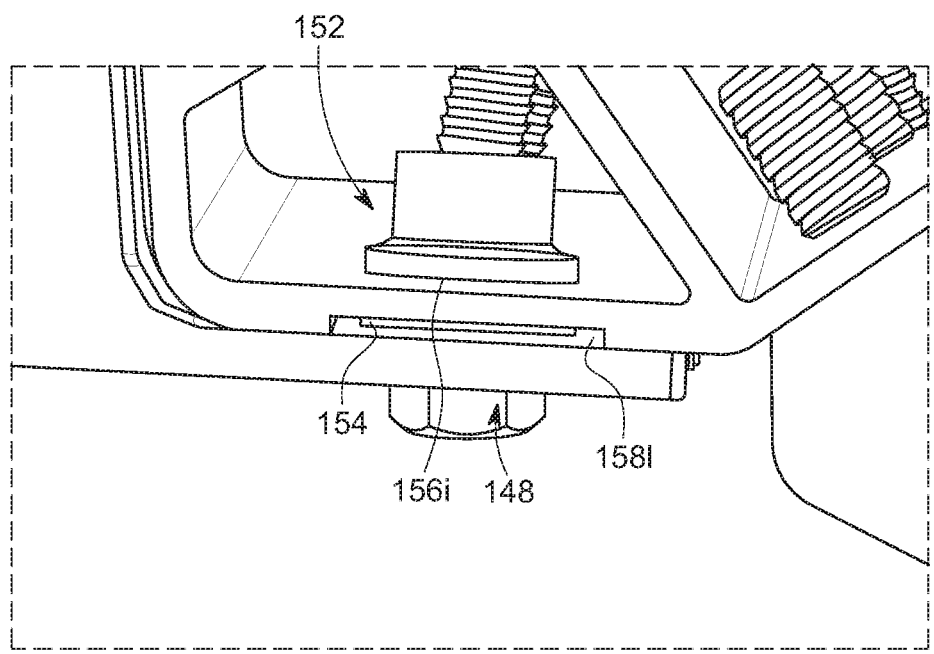
FIG. 6 is a transverse (vertical) cross-sectional view showing connection of the step to the rail.

To enhance the connection between the fasteners 148, the flanges 142u, 142l, and the rail 102, in certain embodiments, the fasteners 148 may further include receptacles 152 (e.g., rivets, weld nuts, or the like) that are configured to receive the bolts 150, as seen in FIGS. 5 and 6. Each receptacle 152 includes a head 154 that is configured for positioning within corresponding openings 156i (FIG. 6), 156ii (FIG. 4) formed in the mounting surfaces 116 of the rail 102 and the flanges 142, respectively. For example, it is envisioned that the head 154 of each receptacle 152 may be configured for receipt within a corresponding opening 156 so as to establish an interference fit therebetween, which may be facilitated and/or enhanced by forming the receptacles 152 from a resilient or flexible material (e.g., one or more rubberized or polymeric materials). As can be appreciated through reference to FIGS. 6 and 7, for example, the openings 156 are located, and the internal supports 122i, 122ii are configured within the rail 102, such that the receptacles 152 and the fasteners 148 are insertable into the internal passages 126 (e.g., the passages 126*i*, 126*iii*) so as to avoid contact with the internal supports 122*i*, 122*ii*.

In certain embodiments, it is envisioned that the rail 102 may include channels 158*u*, 158*l* (FIGS. 3, 5, 6) formed in the mounting surfaces 116*u*, 116*l* that are recessed into the sides 118*i*, 118*iii* of the rail 102, respectively. The channels 158*u*, 158*l* extend longitudinally along the length L of the rail 102 (either partially or entirely) and include the openings 156 such that the heads 154 of the receptacles 152 are generally flush with the mounting surfaces 116*u*, 116*l*.

Alternatively, it is envisioned that the mounting surfaces 116*u*, 116*l* may be uniform in configuration (i.e., devoid of the channels 158), and that the channels 158*u*, 158*l* may instead be provided on the flanges 142*u*, 142*l* of the step 104. In such embodiments, it is envisioned that the heads 154 of the receptacles 152 may extend outwardly of (beyond) the mounting surfaces 116*u*, 116*l* for positioning within the channels 158*u*, 158*l* on the flanges 142*u*, 142*l*, respectively.

Figure 7:
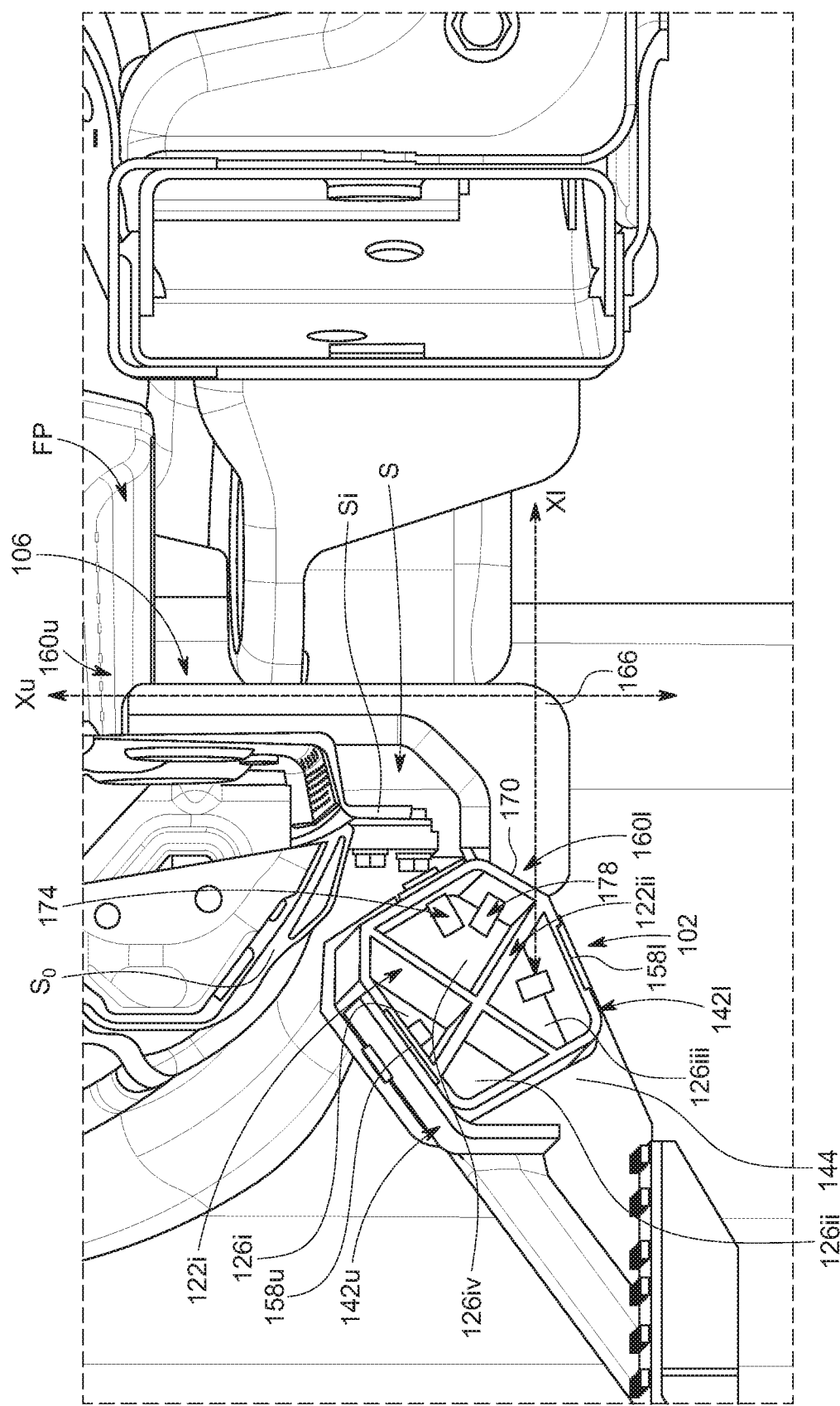
FIG. 7 is a transverse (vertical) cross-sectional view showing connection of the running board to the vehicle.
Figure 8:
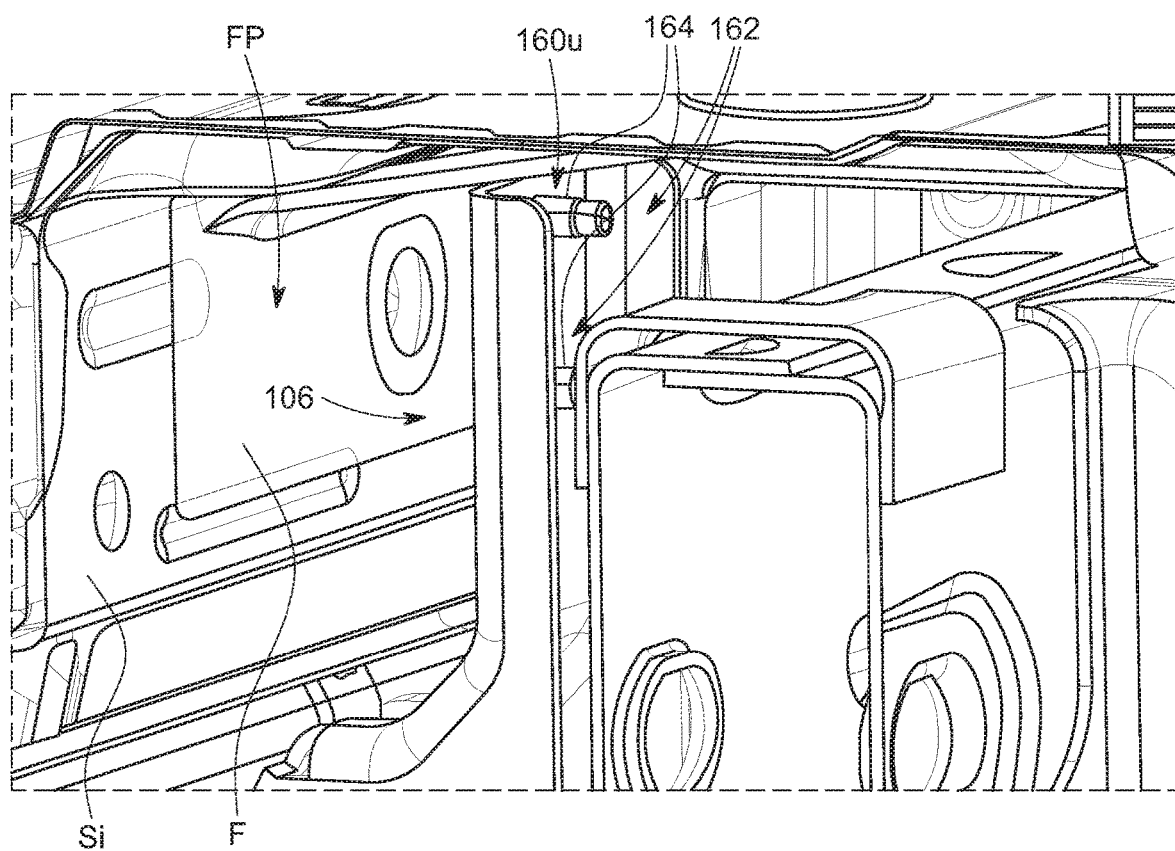
FIG. 8 is a rear, perspective view showing connection of the running board to the vehicle.

With particular reference to FIGS. 7 and 8, connection of the running board 100 to the vehicle V will be discussed. As mentioned above, the rail 102 is secured to the vehicle V via the brackets 106. Although shown as including three brackets 106*i*, 106*ii*, 106*iii* (FIG. 2) in the embodiment of the disclosure illustrated throughout the figures, it should be appreciated that the particular number of brackets 106 utilized in connection with the running boards 100 may be varied without departing from the scope of the present disclosure (e.g., depending on the particular style and configuration of the vehicle V). For example, embodiments that include two brackets 106, four brackets 106, or more are also contemplated herein.

The brackets 106 each include an upper end 160*u* that is configured for securement to a sill S of the vehicle, and a lower end 160*l* that is configured for securement to the rail 102 of the running board 100. More specifically, the upper end 160*u* of each bracket 106 is secured to an inner sill Si of the vehicle V via one or more fasteners 162 (e.g., bolts 164). The inner sill Si is secured (e.g., welded) to a downwardly-extending flange F defined by the vehicle V's floorpan FP, which is secured (e.g., welded) to an outer sill So of the vehicle V, whereby the flange F is positioned between the upper ends 160*u* of the brackets 106 and the sill S.

To facilitate secured connection of the brackets 106 to the vehicle V, it is envisioned that the upper end 160*u* of each bracket 106 may be configured in correspondence with the sill S (i.e., the configuration of the upper end 160*u* of each bracket 106 complements that of the sill S). Thus, while the upper end 160*u* of each bracket 106 is illustrated as being generally linear in configuration (in correspondence with the generally linear configuration of the flange F) in the particular embodiment of the running board 100 and the vehicle V shown throughout the figures, it should be appreciated that the configuration of the brackets 106 may be varied in alternate embodiments of the disclosure. For example, embodiments in which the upper end 160*u* of each bracket 106 is non-linear would not be beyond the scope of the present disclosure.

The lower end 160*l* of each bracket 106 is angularly offset from the upper end 160*u* by a bend 166 (FIG. 7). In the illustrated embodiment, the bend 166 is configured such that the upper end 160*u* and the lower end 160*l* extend along respective axes Xu, Xl that are generally orthogonal in relation (i.e., the brackets 106 are configured such that the bend 166 is approximately 90°). It should be appreciated, however, that the configuration of the bend 166 and the angular offset between the ends 160*u*, 160*l* of the brackets 106 may be varied in alternate embodiments without departing from the scope of the present disclosure (e.g., depending upon the particular configurations of the vehicle V and the rail 102).

The lower end 160*l* of each bracket 106 defines a mounting surface 168 (FIGS. 3, 7) that is configured in correspondence with the side 118*iv* of the rail 102. More specifically, the lower end 160*l* of each bracket 106 includes a beveled end 170 that contacts (mates with) the side 118*iv* such that the bracket 106 is flush-mounted to the rail 102 upon connection.

It is envisioned that the brackets 106 may be secured to the rail 102 in any suitable manner. In the embodiment of the disclosure shown throughout the figures, for example, the brackets 106 include hangers 172 that are integrally (e.g., monolithically) formed with the lower ends 160*l* thereof. The hangers 172 are connectable to the rail 102 via one or more fasteners 174 (e.g., bolts 176), and are configured in correspondence with the side 118*v* of the rail 102 such that the hangers 172 extend from the lower end 160*l* in generally parallel relation to the side 118*v*. To further secure the brackets 106, it is envisioned that one or more fasteners 178 (FIG. 3) (e.g., bolts 180) may be utilized to connect the mounting surface 116 to the side 118*iv* of the rail 102. It is envisioned that the fasteners 174, 178 may be oriented so as to extend into the rail 102 from the brackets 106 (as shown throughout the figures), or into the brackets 106 from the rail 102.

As seen in FIG. 7, for example, the fasteners 174, 178 are located, and the internal supports 122*i*, 122*ii* are configured within the rail 102, such that the fasteners 174, 178 are insertable into one of the internal passages 126 defined by the supports 122*i*, 122*ii* (e.g., the passage 126*iv*) so as to avoid contact with the internal supports 122*i*, 122*ii*.

In certain embodiments, it is envisioned that the running boards 100 included on the vehicle V may be identical in configuration to allow for interchangeability between the driver side and the passenger side of the vehicle V. For example, it is envisioned that the rail 102 may include multiple sets of openings for the fasteners 174, 178 and that the sill S may include multiple sets of openings for the fasteners 162. Alternatively, it is envisioned that the running boards 100 may be configured for connection to either the driver side of the vehicle V or the passenger side. In such embodiments, as illustrated throughout the figures, the brackets 106 may be asymmetrically positioned in relation to the rail 102. For example, as can be appreciated through reference to FIG. 2, the distance between the brackets 106*i*, 106*ii* may differ from the distance between the brackets 106*ii*, 106*iii* such that the bracket 106 is positioned eccentrically (i.e., spaced from a longitudinal midpoint of the rail 102).

With reference to FIGS. 1-8, assembly and use of the running boards 100 will be discussed. To connect the running boards 100 to the vehicle V, the fasteners 162 (FIG. 8) are inserted through the upper ends 160*u* of the brackets 106 into the sill S through the flange F of the floorpan FP. The rail 102 can then be connected to the lower ends 160*u* of the brackets 106 via the fasteners 174, 178 (FIGS. 3, 7).

To connect the step(s) 104 to the rail 102, the step(s) 104 are oriented such that the rail 102 is received within the receiving space 144 (FIGS. 4, 7), whereby the upper flange 142*u* of the rail 102 is positionable adjacent to (in contact with) the upper mounting surface 116*u* (FIG. 3) provided by the sides 118*i* of the rail 102, and the lower flange 142*l* is positionable adjacent to (in contact with) the lower mounting surface 116*l* (FIG. 3) provided by the side 118*iii* of the rail 102. The fasteners 148 (FIGS. 3, 4, 5) can then be inserted into the receptacles 152 (FIGS. 5, 6) through the flanges 142*u*, 142*l* in the rail 102, avoiding contact with the internal supports 122*i*, 122*ii*.

When connected to the vehicle V, as can be appreciated through reference to FIG. 7, the rail 102 is positioned adjacent to the sill S to absorb impact from external objects, such as rocks, boulders, stumps, etc. traversed during travel across ground (e.g., during off-roading). The running boards 100, thus, serve to protect the sill S of the vehicle V.

During off-road use, the step(s) 104 may be removed from the rails 102 to create additional ground clearance when necessary or desirable. To remove the step(s), the fasteners 148 (FIGS. 3, 4, 5) can simply be removed from the receptacles 152 and the flanges 142*u*, 142*l*, after which, the step(s) 104 can be separated from the rail 102.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A running board for a vehicle, the running board comprising:
   a rail defining an upper mounting surface and a lower mounting surface; and
   at least one step removably connected to the rail such that the at least one step extends laterally outward from the rail in cantilevered relation, the at least one step including:
      a front end portion;
      a rear end portion opposite the front end portion;
      an upper flange extending continuously between the front end portion and the rear end portion from a top of the step, the upper flange contacting the upper mounting surface of the rail; and
      a lower flange contacting the lower mounting surface of the rail and extending from a bottom of the step, whereby the lower flange is vertically separated from the upper flange such that the upper flange and the lower flange collectively define a receiving space therebetween, the rail being positioned within the receiving space.

2. The running board of claim 1, wherein the lower flange extends non-continuously between the front end portion and the rear end portion of the at least one step, the lower flange including a first leg located adjacent to the front end portion of the at least one step and a second leg located adjacent to the rear end portion of the at least one step.

3. The running board of claim 1, wherein the rail includes an irregular hexagonal configuration.

4. The running board of claim 3, wherein the rail is symmetrical about a single axis extending in generally orthogonal relation to a length of the rail.

5. The running board of claim 3, wherein the rail includes:
   a first side defining the upper mounting surface and extending in generally parallel relation to the upper flange of the at least one step;
   a second side extending from the first side in generally parallel relation to a height of the at least one step;
   a third side extending from the second side in generally parallel relation to the lower flange of the at least one step, the third side defining the lower mounting surface;
   a fourth side extending from the third side;
   a fifth side extending from the fourth side in generally parallel relation to the second side; and
   a sixth side extending between the fifth side and the first side.

6. The running board of claim 5, wherein the rail further includes a plurality of internal supports to increase rigidity of the rail, the plurality of internal supports being interconnected at a juncture.

7. The running board of claim 6, wherein the juncture is eccentrically located within the rail.

8. The running board of claim 7, wherein the plurality of internal supports define a plurality of internal passages each defining a different cross-sectional area.

9. The running board of claim 7, wherein the plurality of internal supports includes a first support and a second support.

10. The running board of claim 9, wherein the first support extends between the second side and a vertex defined by the fifth side and the sixth side, and the second support extends between the first side and a vertex defined by the third side and the fourth side.

11. A running board for a vehicle, the running board comprising:
  a rail defining an upper channel and a lower channel each extending longitudinally along a length of the rail, the upper channel and the lower channel each including a plurality of openings;
  at least one step removably connected to the rail;
  a plurality of receptacles each including a head located within the plurality of openings in the upper channel and the lower channel, the upper channel being recessed into an upper surface of the rail and the lower channel being recessed into a lower surface of the rail such that the heads of the plurality of receptacles are located within the channels and are positioned between the rail and the at least one step, whereby the plurality of receptacles are received in the plurality of openings such that the heads of the plurality of receptacles are flush with the upper surface of the rail and the lower surface of the rail; and
  a plurality of fasteners located within the plurality of receptacles to removably connect the at least one step to the rail.

12. The running board of claim 11, wherein the rail further includes a plurality of internal supports to increase rigidity of the rail.

13. The running board of claim 12, wherein the plurality of internal supports includes a first support and a second support, the first and second supports being interconnected at a juncture located eccentrically within the rail.

14. The running board of claim 13, wherein the plurality of internal supports define a plurality of internal passages within the rail, the plurality of fasteners being inserted into the plurality of internal passages so as to avoid contact with the plurality of internal supports.

15. A running board for a vehicle, the running board comprising:
  at least one step;
  a rail releasably supporting the at least one step, the rail including:
    a first internal support and a second internal support extending crosswise within the rail to increase rigidity of the rail so as to define four internal passages, the first internal support and the second internal support being interconnected at a juncture located eccentrically within the rail; and
  a plurality of fasteners removably connecting the at least one step to the rail, the plurality of fasteners extending into the internal passages so as to avoid contact with the first internal support and the second internal support.

16. The running board of claim 15, wherein the rail includes an irregular hexagonal configuration.

17. The running board of claim 16, wherein the rail includes a transverse cross-sectional configuration symmetrical about a single axis extending in generally orthogonal relation to a length of the rail.

18. The running board of claim 15, wherein the plurality of internal passages each define a different cross-sectional area.

19. The running board of claim 11, wherein the plurality of receptacles are located within the plurality of openings in an interference fit.

20. The running board of claim 19, wherein each receptacle includes a resilient material to facilitate reception of the plurality of receptacles within the plurality of openings in the interference fit.

* * * * *